US009251098B2

(12) United States Patent
Haid et al.

(10) Patent No.: US 9,251,098 B2
(45) Date of Patent: Feb. 2, 2016

(54) APPARATUS AND METHOD FOR ACCESSING AN ENCRYPTED MEMORY PORTION

(71) Applicant: Infineon Technologies Austria AG, Villach (AT)

(72) Inventors: Josef Haid, Graz (AT); Armin Krieg, Graz (AT); Johannes Grinschgl, Greisdorf (AT); Christian Steger, Graz (AT)

(73) Assignee: Infineon Technologies Austria AG, Villach (AT)

( * ) Notice: Subject to any disclaimer, the term of this patent is extended or adjusted under 35 U.S.C. 154(b) by 49 days.

(21) Appl. No.: 13/953,304

(22) Filed: Jul. 29, 2013

(65) Prior Publication Data
US 2015/0033035 A1 Jan. 29, 2015

(51) Int. Cl.
*G06F 21/78* (2013.01)
*G06F 12/14* (2006.01)

(52) U.S. Cl.
CPC .................................. *G06F 12/1408* (2013.01)

(58) Field of Classification Search
CPC ......... G06F 12/14; G06F 21/70; G06F 21/78; G06F 12/1408; H04L 9/0822
See application file for complete search history.

(56) References Cited

U.S. PATENT DOCUMENTS

| 8,782,434 | B1 * | 7/2014 | Ghose ........................... 713/190 |
| 2007/0088939 | A1 * | 4/2007 | Baumberger et al. ......... 712/248 |
| 2012/0096282 | A1 * | 4/2012 | Henry et al. .................. 713/190 |

OTHER PUBLICATIONS

Bachmann, C., et al., " Automated Power Characterization for Run-Time Power Emulation of SoC Designs." 2010 13th Euromicro Conference on Digital System Design: Architectures, Methods and Tools, Sep. 1-3, 2010, pp. 587-594, Lille, France.
Genser, A., et al., "An Emulation-Based Real-Time Power Profiling Unit for Embedded Software." SAMOS '09. International Symposium on Systems, Architectures, Modeling, and Simulation, 2009, Jul. 20-23, 2009, pp. 67-73, Samos, Greece.
Krieg, A., et al., "Characterization and Handling of Low-Cost Micro-Architectural Signatures in MPSoCs." 2012 17th IEEE European Test Symposium (ETS). May 28-31, 2012, pp. 62-67, Annecy, France.

* cited by examiner

*Primary Examiner* — Izunna Okeke
(74) *Attorney, Agent, or Firm* — Murphy, Bilak & Homiller, PLLC

(57) ABSTRACT

An apparatus for accessing an encrypted memory portion of a memory is provided. The apparatus includes a plurality of signature generators, wherein each signature generator of the plurality of signature generators is configured to generate a signature of a plurality of signatures depending on an instruction of a plurality of instructions, wherein each of the plurality of instructions is a processor instruction for controlling a processor. Moreover, the apparatus includes a key modifier for generating a processed key depending on a standard key and on the plurality of signatures. Furthermore, the apparatus includes a controller for accessing the encrypted memory portion of the memory, wherein the memory access controller is configured to employ the processed key to access the encrypted memory portion of the memory.

17 Claims, 9 Drawing Sheets

APPARATUS AND METHOD FOR ACCESSING AN ENCRYPTED MEMORY PORTION

TECHNICAL FIELD

The present invention relates to detecting attacks on processor architectures, for example, microprocessor architectures, and in particular, to an apparatus and method for accessing an encrypted memory portion.

BACKGROUND

Error injection is a proven method of driving an otherwise protected microprocessor architecture into an unintended state. Therefore, there is a technical necessity to detect such changes in the control flow of the system during run-time.

Depending on the targeted security level and price of the security product, dual modular redundant architectures are employed, which use single voters or checkers employing pre-computed signatures. While the additional memory needed for pre-computed signatures are sometimes not preferable in resource-constraint systems like smart-cards, dual modular redundant implementations are widely used in high security applications.

The complete replication of the main processor unit has inter alia two disadvantages. At first, the needed space doubles accordingly and there is an additional comparison logic needed to compare the results of both cores. Secondly, this comparison logic or voter constitutes a sensible part of the system that has to be specifically hardened against attacks.

It would be highly beneficial if improved concepts for detecting error injection would be provided.

SUMMARY

According to an embodiment, an apparatus for accessing an encrypted memory portion of a memory is provided. The apparatus comprises a plurality of signature generators, wherein each signature generator of the plurality of signature generators is configured to generate a signature of a plurality of signatures depending on an instruction of a plurality of instructions, wherein each of the plurality of instructions is a processor instruction for controlling a processor. Moreover, the apparatus comprises a key modifier for generating a processed key depending on a standard key and on the plurality of signatures. Furthermore, the apparatus comprises a memory access controller for accessing the encrypted memory portion of the memory, wherein the memory access controller is configured to employ the processed key to access the encrypted memory portion of the memory.

Moreover, an apparatus for accessing an encrypted memory portion of a memory according to another embodiment is provided. The apparatus comprises a plurality of signature generators, wherein each signature generator of the plurality of signature generators is configured to generate a signature of a plurality of signatures depending on an instruction of a plurality of instructions, wherein each of the plurality of instructions is a processor instruction for controlling a processor. Furthermore, the apparatus comprises a key modifier for generating a processed key depending on a standard key and on the plurality of signatures. Moreover, the apparatus comprises a memory access controller for accessing the encrypted memory portion of the memory, wherein the memory access controller is configured to employ the processed key to access the encrypted memory portion of the memory. The plurality of instructions comprises a first group of instructions and a second group of instructions. The plurality of signature generators comprises a first group of signature generators and a second group of signature generators. Moreover, the plurality of signatures being generated by the plurality of signature generators comprises a first group of signatures and a second group of signatures. Each signature generator of the first group of signature generators is configured to generate a signature of the first group of signatures depending on an instruction of the first group of instructions being stored in a slave pipeline. Each signature generator of the second group of signature generators is configured to generate a signature of the second group of signatures depending on an instruction of the second group of instructions being stored in a master pipeline. The key modifier comprises a plurality of XOR operation modules. Each XOR operation module of the plurality of XOR operation units is configured to conduct a first XOR operation on a first operand and on a second operand to generate a third operand, and is configured to conduct a second XOR operation on the third operand and on a fourth operand to generate an intermediate key of a plurality of intermediate keys. The first operand is one of the signatures of the first group of signatures, wherein the second operand is the standard key or a further intermediate key of the plurality of intermediate keys, wherein the fourth operand is one of the signatures of the second group of signatures. One of the plurality of intermediate keys is the processed key.

According to another embodiment, a method for accessing an encrypted memory portion of a memory is provided. The method comprises:

Generating a plurality of signatures depending on an instruction of a plurality of instructions, wherein each of the plurality of instructions is a processor instruction for controlling a processor.

Generating a processed key depending on a standard key and on the plurality of signatures. And Accessing the encrypted memory portion of the memory, wherein the processed key is employed to access the encrypted memory portion of the memory.

Those skilled in the art will recognize additional features and advantages upon reading the following detailed description, and upon viewing the accompanying drawings.

BRIEF DESCRIPTION OF THE DRAWINGS

Before embodiments of the present invention are described in detail using the accompanying figures, it is to be pointed out that the same or functionally equal elements are given the same reference numbers in the figures and that a repeated description for elements provided with the same reference numbers is omitted. Hence, descriptions provided for elements having the same reference numbers are mutually exchangeable.

DETAILED DESCRIPTION

Figure 1A:
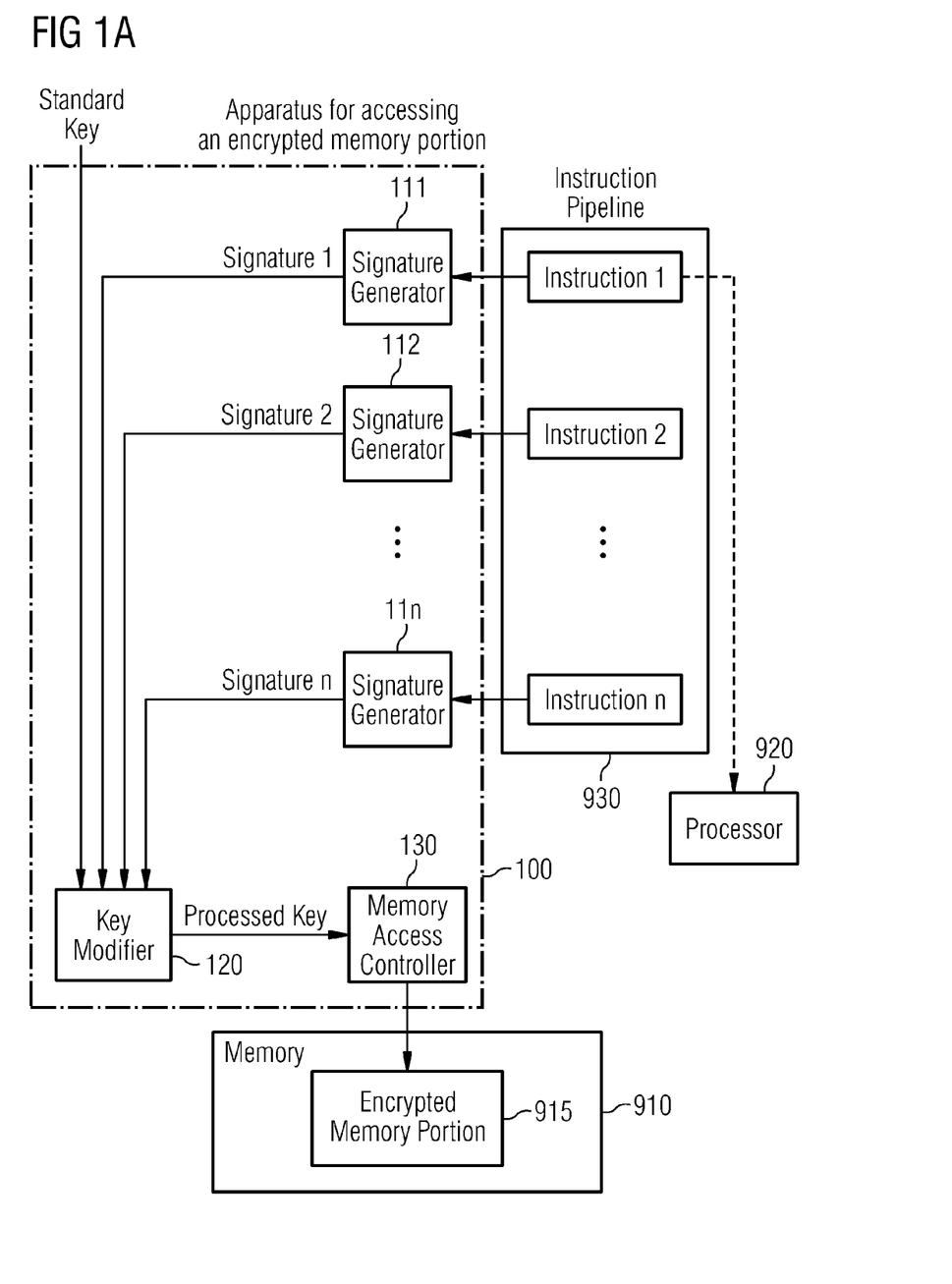
FIG. 1a illustrates an apparatus for accessing an encrypted memory portion of a memory according to an embodiment.

FIG. 1a illustrates an apparatus 100 for accessing an encrypted memory portion 915 of a memory 910 according to an embodiment.

The apparatus 100 comprises a plurality of signature generators 111, 112, . . . , 11n.

Each signature generator of the plurality of signature generators 111, 112, . . . , 11n is configured to generate a signature of a plurality of signatures depending on an instruction of a plurality of instructions. Each of the plurality of instructions is a processor instruction for controlling a processor 920. For example, any kind of microprocessor is regarded as a processor.

Moreover, the apparatus 100 comprises a key modifier 120 for generating a processed key depending on a standard key and on the plurality of signatures.

Furthermore, the apparatus 100 comprises a memory access controller 130 for accessing the encrypted memory portion 915 of the memory 910, wherein the memory access controller 130 is configured to employ the processed key to access the encrypted memory portion 915 of the memory 910.

Each instruction of the plurality of instructions may be an instruction of an instruction set of a processor, e.g., of an instruction set of a microprocessor. Typical instructions may, for example, be microprocessor instructions, such as "LOAD" (a value from a memory address), "STORE" (a value at a memory address), or "ADD" (two values being stored in two registers).

Each instruction of the plurality of instructions may, for example, be stored indicated by Opcode (operation code), for example, a number, which identifies an instruction of an instruction set of a processor, e.g., of a microprocessor. The Opcode itself, may, for example, be a number represented by a plurality of bits, represented by one or more decimal ciphers, by one or more hexadecimal ciphers or, e.g., by one or more bytes.

For example, the Opcode "LOAD" may, for example, be represented by the hexadecimal number "51", the Opcode "STORE", may, for example, be represented by the hexadecimal number "52" and the Opcode "ADD", may, for example, be represented by the hexadecimal number "8C".

The instructions that are used to generate the signatures may, for example, be stored as Opcodes in an instruction pipeline 930. The instruction pipeline 930 may, for example, be a particular portion of a memory for storing instructions. The apparatus 100 may be configured to load the instructions from the instruction pipeline 930 to generate the signatures.

A signature that is generated depending on an instruction, e.g. depending on an Opcode, may, for example, be a number that is generated depending on one of the instructions. Such a signature may, for example, as the Opcode itself, be represented by a plurality of bits, by one or more decimal ciphers, by one or more hexadecimal ciphers or, e.g., by one or more bytes.

Figure 1B:
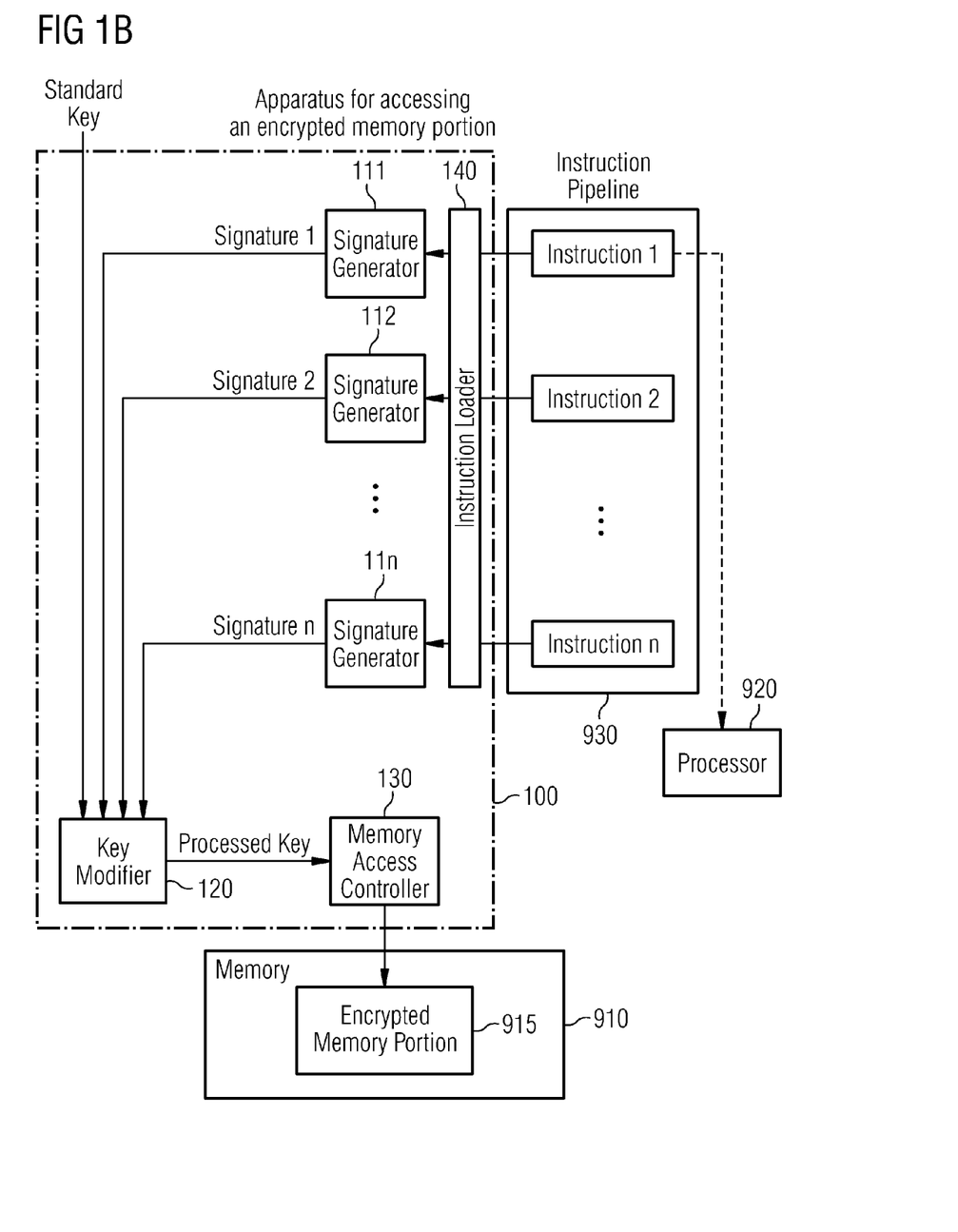
FIG. 1b illustrates an apparatus for accessing an encrypted memory portion of a memory according to another embodiment.

In a particular embodiment, illustrated by FIG. 1b, the apparatus 100 may comprise an instruction loader 140 to load one or more of the instructions from the instruction pipeline 930.

Each signature generator of the plurality of signature generators 111, 112, . . . , 11n is configured to generate a signature of the plurality of signatures by applying a hash-function on an instruction of the plurality of instructions. Generating a signature by applying a hash-function is particularly advantageous, as, even when, for example, two Opcodes vary only slightly (e.g. a hexadecimal Opcode "51" for "LOAD" and a hexadecimal Opcode 52 for "STORE"), the two hash values that result from applying a hash function on each of the two Opcodes will vary significantly. For example, the hexadecimal Opcode "51" may, for example, result to a (binary) value "100101" and the hexadecimal Opcode "52" will result to a (binary) value "010100".

In an embodiment, the key modifier 120 is configured to generate the processed key by conducting an XOR operation on the standard key and on one of the plurality of signatures. Details on some specific embodiments will be provided below.

Embodiments are based on a process to generate low-cost signature hardware by utilizing only parts of proven hash algorithms. As Hash algorithms, such as SHA (Secure Hash Algorithm) are round-based, a considerable amount of hardware may have to be implemented to generate the check sum in one clock cycle in parallel. Alternatively, the check sum may be generated iteratively, and only one round may be generated in hardware. (Pre- and post-processing may be conducted using an iterative approach). New characterization of the hardware may be necessary. The reduction and characterization process allows implementing small signature generation hardware modules while keeping important properties of the underlying algorithms. Consequently, the integration of multiple signature generators and voters is enabled.

The input signals of these generators are carefully selected by experienced professionals and supported by characterization processes used in high-level power modeling. In case of an attack, the signals should change their state with high probability. The connection between signal activity and the processing program should be deterministic. All signals should be independent from each other to avoid redundancy. A functional RTL (register transfer level) simulation may be employed using activation and correlation filters.

Internal intermediate results can be further obfuscated by the usage of a random mask and masking results can be further used for memory encryption key control.

Compared with the state of the art, the embodiments exhibit a plurality of advantages. For example, embodiments provide a fine grained signature covered of system internal control functionality. Moreover, multiple voters make it more difficult to attack a redundant execution concept. Furthermore, extended memory access schemes allow for the immediate invalidation of processed data.

Embodiments are based on the concept of generating signatures from carefully selected control signals in different important parts of a secure microprocessor system. These signatures are directly used for memory access key control and therefore, they allow for the immediate data invalidation in case of attacks.

In an embodiment, the combination of software generated keys for write accesses and hardware-generated keys for read access allows for the efficient implementation of high security memory zones.

For example, an internal key (for memory access) may be generated from an external key (standard key). The internal key may be obtained by applying XOR operations using the external key and the signatures as operands. In an embodiment, generating the internal key is implemented in hardware. The internal key is used for read access.

In an embodiment, for writing into the memory, e.g., no hardware-generated key is used, but instead, a compiler generates the key (software-generated key). Generating the key for writing by a compiler is possible, e.g., as the external key (standard key) and the functionality of the hardware is known. The software-generated key is thus based on an expected value and the hardware-generated key is the actual value and depends on a machine state. If an attacker would, for example, modify the signatures, a hardware-generated key, inconsistent with the software-generated key would be obtained, and no (valid) data would be loaded from the memory.

Figure 2A:
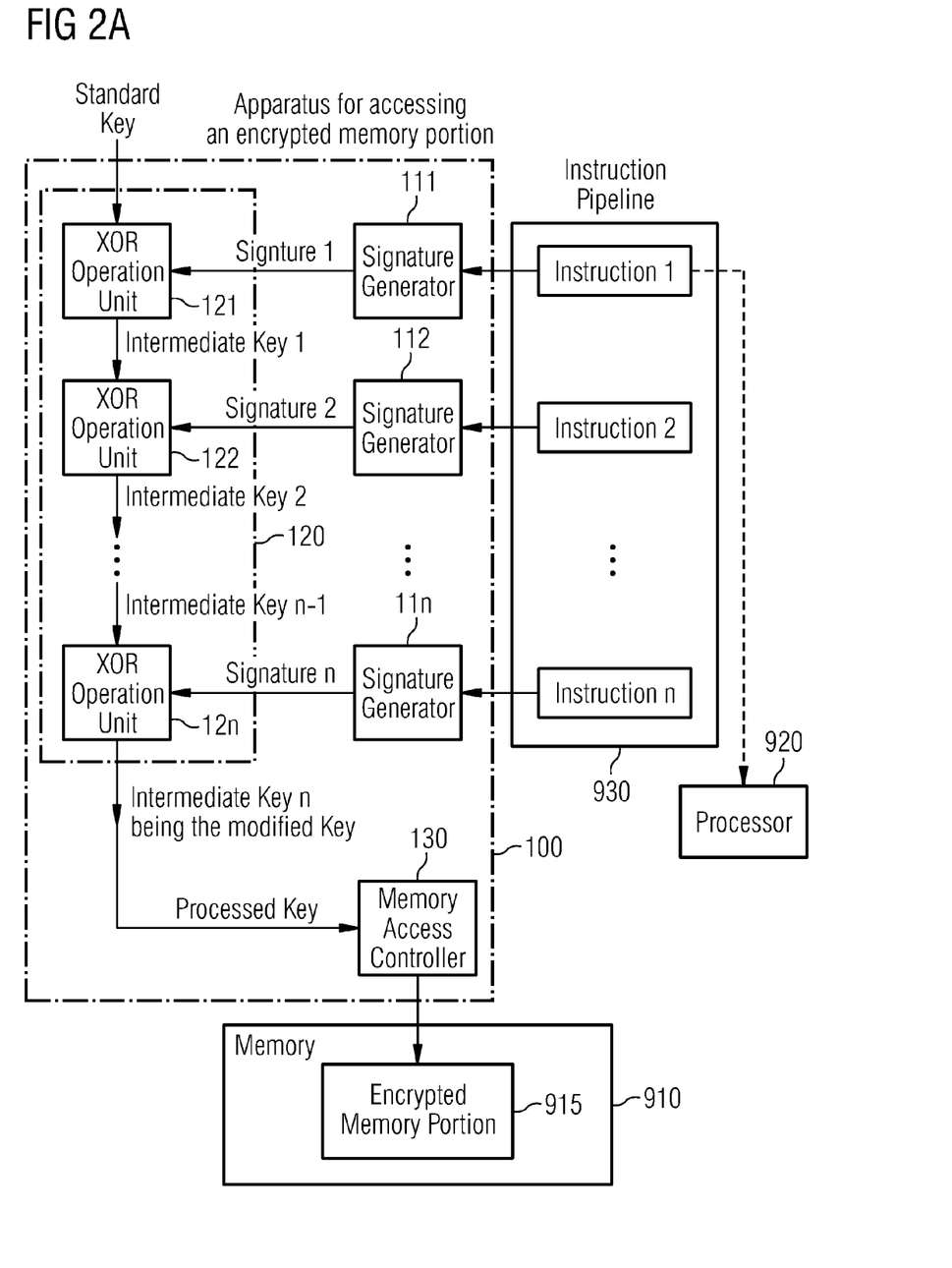
FIG. 2a illustrates an apparatus for accessing an encrypted memory portion of a memory according to a further embodiment.

FIG. 2a illustrates an apparatus 100 according to a further embodiment, wherein the key modifier 120 comprises a plurality of XOR operation units 121, 122, 12n.

Each XOR operation unit 121, 122, 12n of the plurality of XOR operation units 121, 122, 12n is configured to generate an intermediate key of a plurality of intermediate keys by conducting an XOR operation on a first operand and on a second operand.

The first operand is one signature (Signature 1, Signature 2, . . . , Signature n) of the plurality of signatures (Signature 1, Signature 2, . . . , Signature n). The second operand is the standard key or a further intermediate key of the plurality of intermediate keys. One of the plurality of intermediate keys is the processed key.

In an embodiment, the plurality of XOR operation units 121, 122, 12n are arranged such that no two different XOR operation units of the plurality of XOR operation units 121, 122, 12n exist, which conduct said XOR operation on the same signature of the plurality of signatures. According to a particular embodiment, additionally or alternatively, the plurality of XOR operation units 121, 122, 12n are arranged such that no two different XOR operation units of the plurality of XOR operation units exist 121, 122, 12n, which conduct said XOR operation on the same intermediate key of the plurality of intermediate key.

Figure 2B:
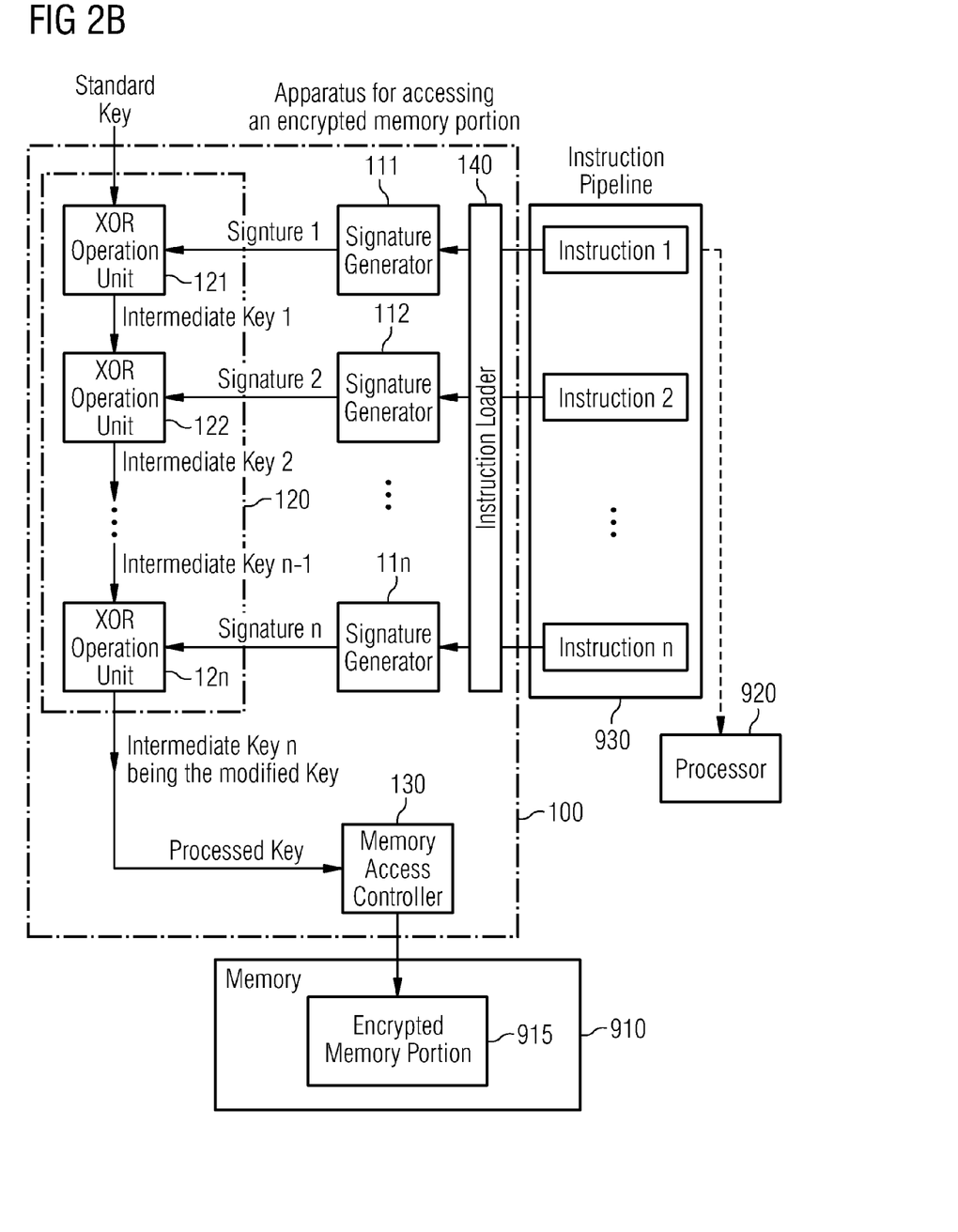
FIG. 2b illustrates an apparatus for accessing an encrypted memory portion of a memory according to another embodiment.

FIG. 2b illustrates an apparatus 100 for accessing an encrypted memory portion similar to the apparatus 100 of FIG. 2a. The apparatus 100 further comprises an instruction loader 140 for loading one or more of the plurality of instructions from an instruction pipeline 930, e.g., an integer pipeline. The plurality of instructions is stored in the instruction pipeline 930.

Figure 2C:
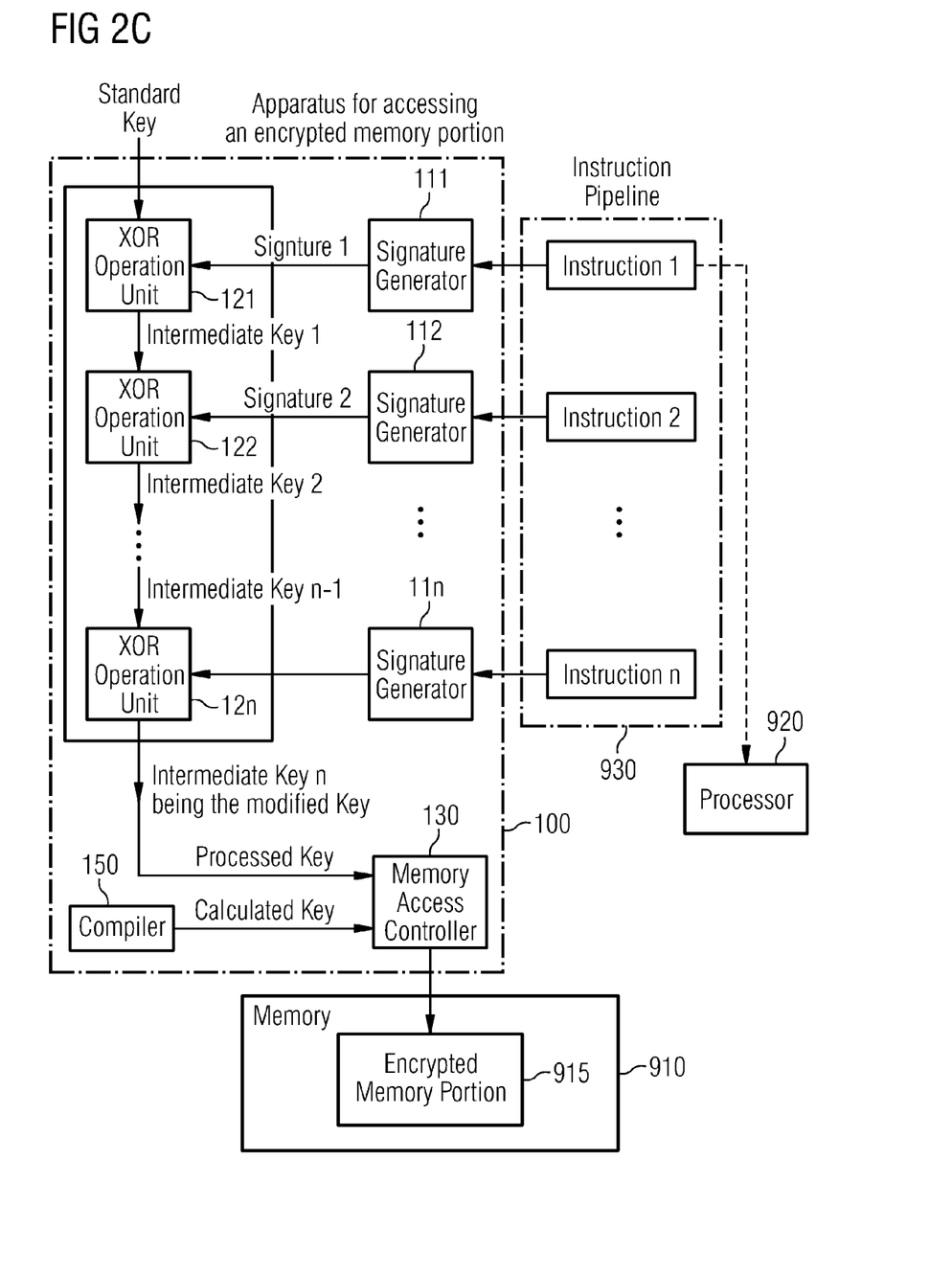
FIG. 2c illustrates an apparatus for accessing an encrypted memory portion of a memory according to a further embodiment.

In a particular embodiment illustrated by FIG. 2c, the apparatus 100 for accessing an encrypted memory portion further comprises a compiler 150 for calculating, depending on the plurality of instructions, a calculated key. The memory access controller 130 is configured to employ the calculated key for encrypting data to obtain encrypted data. Furthermore, the memory access controller 130 is configured to store the encrypted data into the encrypted memory portion 915 of the memory 910.

Figure 2D:
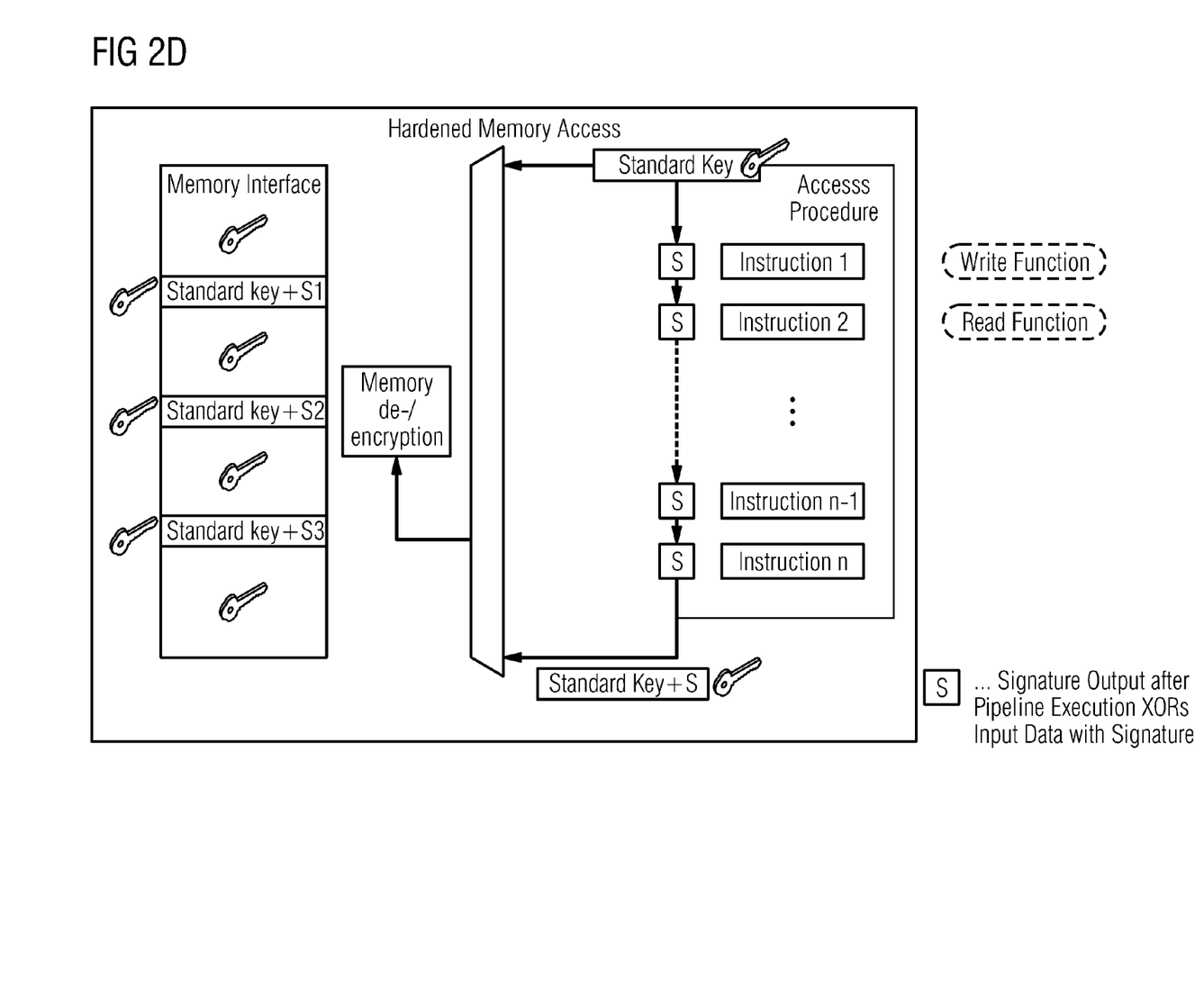
FIG. 2d depicts a scenario to another embodiment, illustrating a hardened memory access using additionally hardened per-procedure keys for accessing the encrypted memory portion.

FIG. 2d depicts a scenario according to another embodiment similar to the embodiments illustrated by FIG. 2a-2c, wherein FIG. 2d illustrates a hardened memory access using additional hardware-generated per-procedure key.

Following the basic signature generation principle as shown in FIG. 2d, an extended memory access protection scheme can be implemented. In this case, a calculated signature for a given instruction, for example at the end of the pipeline execution, is assumed.

It is assumed that there exists a compiler that knows the processor signature generation behavior and is able pre-define a final signature for a given procedure. Building on these assumptions a memory access scheme as depicted in FIG. 2d can be implemented. In this case, the compiler provides an encryption key for a memory write function that accesses a high-security memory zone. This results in double memory encryption for this hardened memory region.

For the read functionality to this specific memory region, no externally given key is used but the signature of a required access procedure. This way, if a fault attack disrupts this access procedure or if a wrong access procedure has been used, the data will be invalidated immediately. E.g., as the signatures are used for generating the processed key, e.g., by conducting XOR operations, an incorrect signature immediately results in a wrong processed key.

The result of the scheme provided by FIG. 2d is a compile-supported fault-attack protection system that does not have to rely on a redundant processor architecture.

Figure 3A:
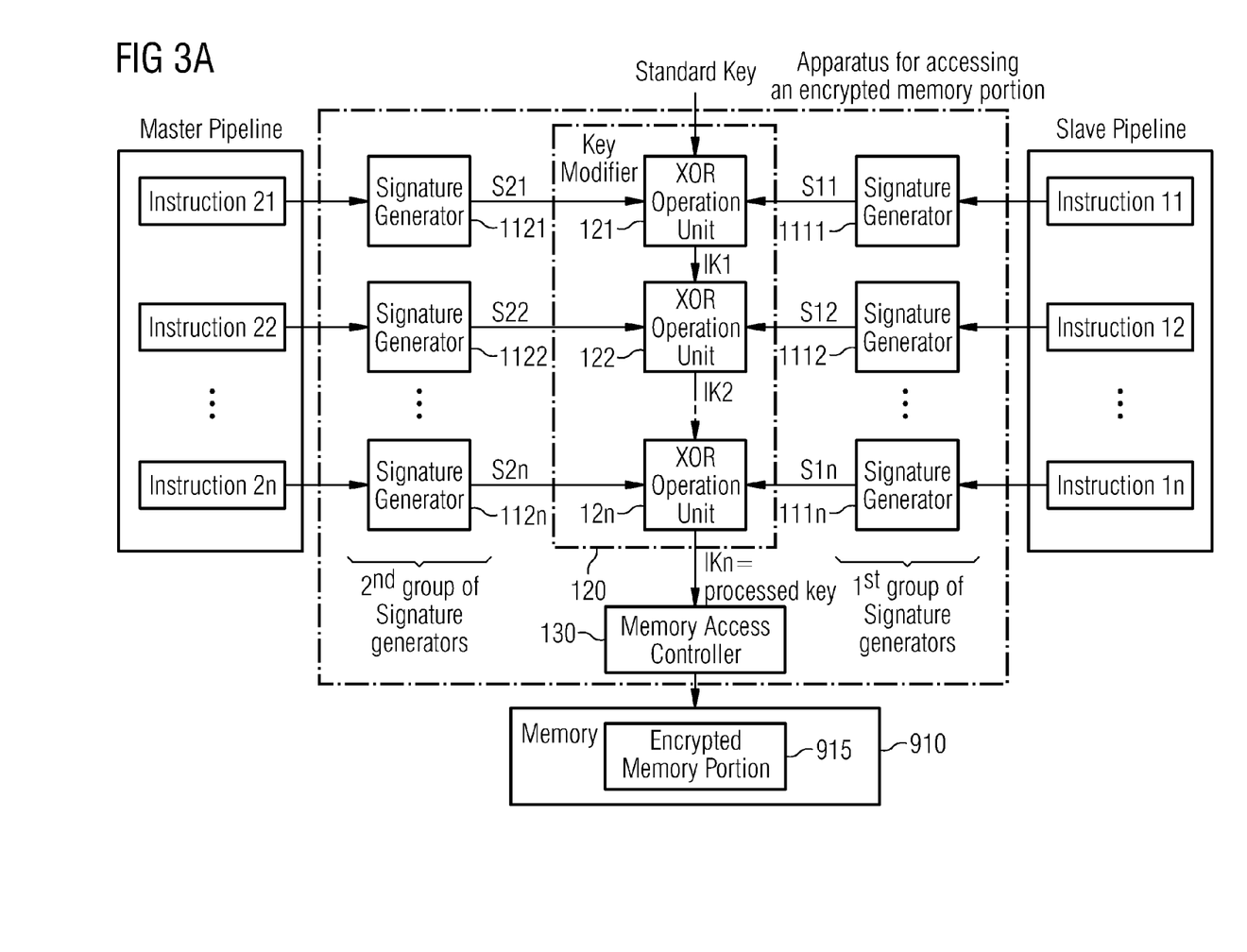
FIG. 3a illustrates an apparatus for accessing an encrypted memory portion of a memory according to a further embodiment.

FIG. 3a illustrates an apparatus 100 for accessing an encrypted memory portion 915 of a memory 910 according to another embodiment.

The apparatus 100 comprises a plurality of signature generators 1111, 1112, 111n, 1121, 1122, 112n, wherein each signature generator of the plurality of signature generators 1111, 1112, 111n, 1121, 1122, 112n is configured to generate a signature of a plurality of signatures depending on an instruction of a plurality of instructions. Each of the plurality of instructions is a processor instruction for controlling a processor.

Moreover, the apparatus comprises a key modifier 120 for generating a processed key depending on a standard key and on the plurality of signatures.

Furthermore, the apparatus comprises a memory access controller 130 for accessing the encrypted memory portion 915 of the memory 910. The memory access controller 130 is configured to employ the processed key to access the encrypted memory portion 915 of the memory 910.

The plurality of instructions comprises a first group of instructions being stored in a slave pipeline and a second group of instructions being stored in a master pipeline.

The plurality of signature generators 1111, 1112, 111n, 1121, 1122, 112n comprises a first group of signature generators 1111, 1112, 111n and a second group of signature generators 1121, 1122, 112n.

The plurality of signatures S11, S12, S1n, S21, S22, S2n being generated by the plurality of signature generators 1111, 1112, 111n, 1121, 1122, 112n comprises a first group of signatures S11, S12, S1n and a second group of signatures S21, S22, S2n.

Each signature generator of the first group of signature generators 1111, 1112, 111n is configured to generate a signature of the first group of signatures S11, S12, S1n depending on an instruction of the first group of instructions, Each signature generator of the second group of signature generators 1121, 1122, 112n is configured to generate a signature of the second group of signatures S21, S22, S2n depending on an instruction of the second group of instructions, The key modifier comprises a plurality of XOR operation modules 121, 122, 12n. Each XOR operation module of the plurality of XOR operation modules is configured to conduct a first XOR operation on a first operand and on a second operand to generate a third operand, and is moreover configured to conduct a second XOR operation on the third operand and on a fourth operand to generate an intermediate key of a plurality of intermediate keys IK1, IK2, IKn.

The first operand is one of the signatures of the first group of signatures S11, S12, S1n. The second operand is the standard key or a further intermediate key of the plurality of intermediate keys IK1, IK2, IKn. The fourth operand is one of the signatures of the second group of signatures S21, S22, S2n.

One intermediate key IKn of the plurality of intermediate keys IK1, IK2, IKn is the processed key.

For example, if in each processing stage, the signature of the signature generator of the first group of signature generators 1111, 1112, 111n is identical to the signature of the signature generator of the second group of signature generators 1121, 1122, 112n, then the resulting intermediate keys IK1, IK2, IKn and finally, the resulting processed key IKn is equal to the standard key. However, if, for example, in one processing stage, the signature of the signature generator of the first group of signature generators 1111, 1112, 111n is not identical to the signature of the signature generator of the second group of signature generators 1121, 1122, 112n, then one or more of the resulting intermediate keys IK1, IK2, IKn and finally, the resulting processed key IKn is not equal to the standard key.

According to an embodiment, the plurality of XOR operation modules 121, 122, 12n are arranged such that no two different XOR operation modules of the plurality of XOR operation modules 121, 122, 12n exist, which conduct said XOR operation on the same intermediate key of the plurality of intermediate keys.

Figure 3B:
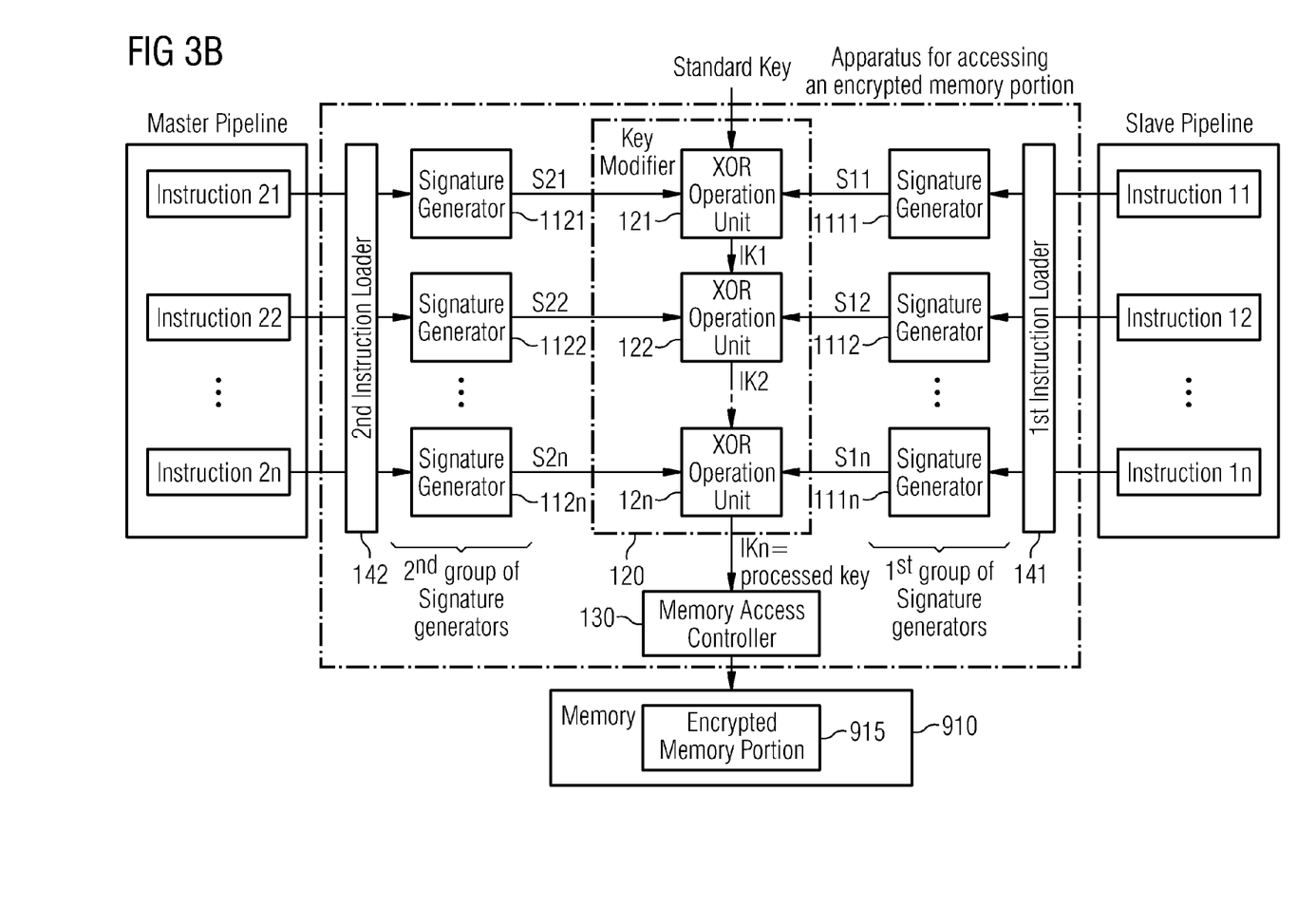
FIG. 3b illustrates an apparatus for accessing an encrypted memory portion of a memory according to another embodiment.

FIG. 3b illustrates an apparatus 100 for accessing an encrypted memory portion 915 of a memory 910 according to another embodiment. In FIG. 3b, the apparatus 100 further comprises a first instruction loader 141 for loading one or more of the first group of instructions from a slave pipeline, wherein the first group of instructions are stored in the slave pipeline. Moreover, the apparatus 100 further comprises a second instruction loader 142 for loading one or more instructions of the second group of instructions from a master pipeline, wherein the second group of instructions is stored in the master pipeline.

According to another particular embodiment, the memory access controller 130 is configured to employ the standard key for memory encryption, and the memory access controller 130 is configured to employ the processed key for memory decryption.

In the following, an implementation example relating to a dual-CPU is described with reference to FIG. 3c.

Figure 3C:
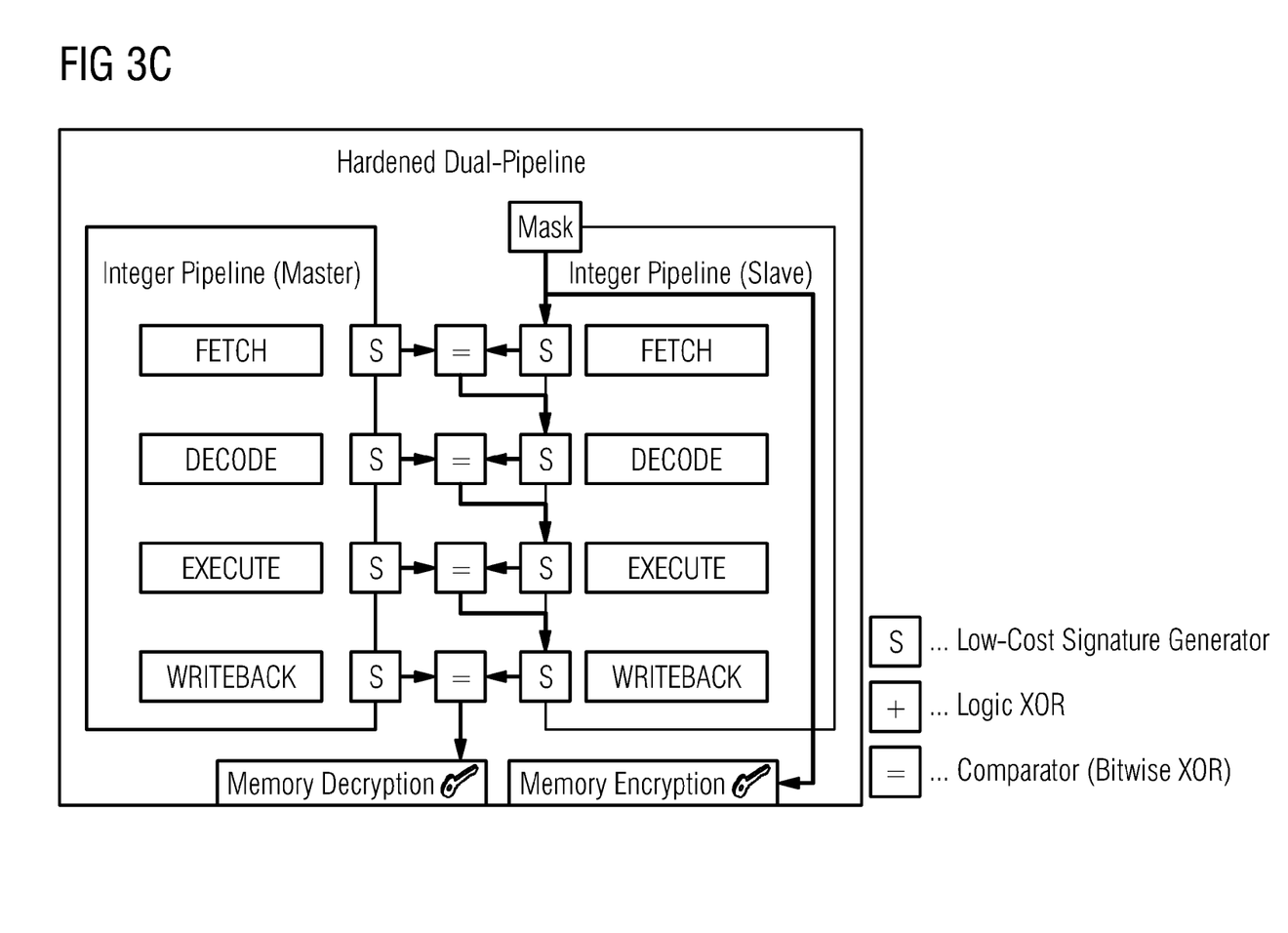
FIG. 3c depicts a scenario according to a further embodiment, illustrating a dual-integer-pipeline hardened against fault-attacks.

In particular, FIG. 3c depicts a scenario according to a further embodiment illustrating a dual integer-pipeline hardened against fault-attacks. More particularly, FIG. 3c implements an exemplary 4 stage pipeline and hidden registers, data-path.

In case of high-security products under high cost pressure, only the integer pipeline of the design is duplicated and its corresponding stages are augmented with signature generators.

In this configuration the master pipeline comprises its complete set of register and access to system memories.

The slave pipeline only has access to shadow registers and a duplicated integer ALU.

In FIG. 3c, this principle is depicted without the needed pipeline registers and data-path which are identical for both pipelines.

The signature generators are fed with control signals from every single pipeline stage and in case of the slave core, also a XOR with a given masking value is done.

In case of the first stage the input mask may, for example, be a pre-defined mask. The mask may, for example, be an internal static secret.

These signals are determined using an extended power characterization flow, for example, as is known in the art. This way a bitwise comparison using a XOR between both signatures will result in the given mask if no changes occurred.

For two signatures, $S_{MASTER}$, $S_{SLAVE}$, the relationship:

$$\text{mask XOR } S_{MASTER} \text{ XOR } S_{SLAVE} = \text{mask; if } S_{MASTER} = S_{SLAVE}$$

may be employed.

If $S_{MASTER} = S_{SLAVE}$ is true for all processing stages, the key for decrypting is equal to the standard key.

If in one processing stage, $S_{MASTER} \neq S_{SLAVE}$, then the key for decryption becomes invalid.

For every stage the result of the previous one is used as a mask and therefore, comparison errors will propagate through the design. This principle allows for the immediate detection of control-flow changes in either the master of slave pipeline and allows for memory key control. When a control flow disruption is detected, the memory decryption key will be wrong resulting into an immediate invalidation of read data.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding unit or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of embodiments can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to embodiments comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

What is claimed is:

1. An apparatus for accessing an encrypted memory portion of a memory, comprising:
   a plurality of signature generators, the signature generators being implemented using digital hardware or a computer or a combination of a computer and digital hardware, wherein each signature generator of the plurality of signature generators is configured to generate a signature of a plurality of signatures depending on an instruction of a plurality of instructions, wherein each of the plurality of instructions is a processor instruction for controlling a processor;
   a key modifier implemented using digital hardware or a computer or a combination of a computer and digital hardware and configured to generate a processed key depending on a standard key and on the plurality of signatures; and
   a memory access controller for accessing the encrypted memory portion of the memory, wherein the memory access controller is configured to employ the processed key to access the encrypted memory portion of the memory.

2. An apparatus according to claim 1, wherein the apparatus further comprises an instruction loader for loading one or more of the plurality of instructions from an instruction pipeline, wherein the plurality of instructions are stored in the instruction pipeline.

3. An apparatus according to claim 1, wherein each signature generator of the plurality of signature generators is configured to generate a signature of the plurality of signatures by applying a hash-function on an instruction of the plurality of instructions.

4. An apparatus according to claim 1, wherein the key modifier is configured to generate the processed key by conducting an XOR operation on the standard key and on one of the plurality of signatures.

5. An apparatus according to claim 1,
   wherein the key modifier comprises a plurality of XOR operation units, wherein each XOR operation unit of the plurality of XOR operation units is configured to generate an intermediate key of a plurality of intermediate keys by conducting an XOR operation on a first operand and on a second operand,
   wherein the first operand is one of the plurality of signatures,
   wherein the second operand is the standard key or a further intermediate key of the plurality of intermediate keys, and
   wherein one of the plurality of intermediate keys is the processed key.

6. An apparatus according to claim 5, wherein the apparatus further comprises an instruction loader for loading one or more of the plurality of instructions from an instruction pipeline, wherein the plurality of instructions are stored in the instruction pipeline.

7. An apparatus according to claim 5, wherein the plurality of XOR operation units are arranged such that no two different XOR operation units of the plurality of XOR operation units exist, which conduct said XOR operation on the same signature of the plurality of signatures.

8. An apparatus according to claim 5, wherein the plurality of XOR operation units are arranged such that no two different XOR operation units of the plurality of XOR operation units exist, which conduct said XOR operation on the same intermediate key of the plurality of intermediate key.

9. An apparatus according to claim 5,
   wherein the plurality of XOR operation units are arranged such that no two different XOR operation units of the plurality of XOR operation units exist, which conduct said XOR operation on the same signature of the plurality of signatures, and
   wherein the plurality of XOR operation units are arranged such that no two different XOR operation units of the plurality of XOR operation units exist, which conduct said XOR operation on the same intermediate key of the plurality of intermediate keys.

10. An apparatus according to claim 1,
    wherein the apparatus further comprises a compiler for calculating, depending on the plurality of instructions, a calculated key,
    wherein the memory access controller is configured to employ the calculated key for encrypting data to obtain encrypted data, and
    wherein the memory access controller is configured to store the encrypted data into the encrypted memory portion of the memory.

11. An apparatus according to claim 1,
    wherein the plurality of instructions comprises a first group of instructions and a second group of instructions, wherein the plurality of signature generators comprises a first group of signature generators and a second group of signature generators, wherein the plurality of signatures being generated by the plurality of signature generators comprises a first group of signatures and a second group of signatures, wherein each signature generator of the first group of signature generators is configured to generate a signature of the first group of signatures depending on an instruction of the first group of instructions, wherein each signature generator of the second group of signature generators is configured to generate a signature of the second group of signatures depending on an instruction of the second group of instructions, wherein the key modifier comprises a plurality of XOR operation modules, wherein each XOR operation module of the plurality of XOR operation modules is configured to conduct a first XOR operation on a first operand and on a second operand to generate a third operand, and is configured to conduct a second XOR operation on the third operand and on a fourth operand to generate an intermediate key of a plurality of intermediate keys, wherein the first operand is one of the signatures of the first group of signatures, wherein the second operand is the standard key or a further intermediate key of the plurality of intermediate keys, wherein the fourth operand is one of the signatures of the second group of signatures, and wherein one of the plurality of intermediate keys is the processed key.

12. An apparatus according to claim 11,
wherein the apparatus further comprises a first instruction loader for loading one or more of the first group of instructions from a slave pipeline, wherein the first group of instructions are stored in the slave pipeline, and
wherein the apparatus further comprises a second instruction loader for loading one or more instructions of the second group of instructions from a master pipeline, wherein the second group of instructions are stored in the master pipeline.

13. An apparatus according to claim 11, wherein the plurality of XOR operation modules are arranged such that no two different XOR operation modules of the plurality of XOR operation modules exist, which conduct said XOR operation on the same intermediate key of the plurality of intermediate keys.

14. An apparatus according to claim 11,
wherein the memory access controller is configured to employ the standard key for memory encryption, and
wherein the memory access controller is configured to employ the processed key for memory decryption.

15. An apparatus for accessing an encrypted memory portion of a memory, comprising:
a plurality of signature generators, the signature generators being implemented using digital hardware or a computer or a combination of a computer and digital hardware, wherein each signature generator of the plurality of signature generators is configured to generate a signature of a plurality of signatures depending on an instruction of a plurality of instructions, wherein each of the plurality of instructions is a processor instruction for controlling a processor;

a key modifier implemented using digital hardware or a computer or a combination of a computer and digital hardware and configured to generate a processed key depending on a standard key and on the plurality of signatures; and a memory access controller for accessing the encrypted memory portion of the memory, wherein the memory access controller is configured to employ the processed key to access the encrypted memory portion of the memory;

wherein the plurality of instructions comprises a first group of instructions and a second group of instructions, wherein the plurality of signature generators comprises a first group of signature generators and a second group of signature generators, wherein the plurality of signatures being generated by the plurality of signature generators comprises a first group of signatures and a second group of signatures, wherein each signature generator of the first group of signature generators is configured to generate a signature of the first group of signatures depending on an instruction of the first group of instructions being stored in a slave pipeline, wherein each signature generator of the second group of signature generators is configured to generate a signature of the second group of signatures depending on an instruction of the second group of instructions being stored in a master pipeline, wherein the key modifier comprises a plurality of XOR operation modules, wherein each XOR operation module of the plurality of XOR operation modules is configured to conduct a first XOR operation on a first operand and on a second operand to generate a third operand, and is configured to conduct a second XOR operation on the third operand and on a fourth operand to generate an intermediate key of a plurality of intermediate keys, wherein the first operand is one of the signatures of the first group of signatures, wherein the second operand is the standard key or a further intermediate key of the plurality of intermediate keys, wherein the fourth operand is one of the signatures of the second group of signatures, and wherein one of the plurality of intermediate keys is the processed key.

16. A method for accessing an encrypted memory portion of a memory, wherein the method comprises:
generating a plurality of signatures depending on an instruction of a plurality of instructions, wherein each of the plurality of instructions is a processor instruction for controlling a processor;
generating a processed key depending on a standard key and on the plurality of signatures; and
accessing the encrypted memory portion of the memory, wherein the processed key is employed to access the encrypted memory portion of the memory.

17. A non-transitory computer-readable medium, comprising, stored thereupon, a computer program for implementing the method of claim 16, when being executed by a computer or signal processor.

* * * * *